No. 609,048. Patented Aug. 16, 1898.
F. ROBBIN.
FURNACE.
(Application filed Feb. 15, 1898.)
(No Model.) 2 Sheets—Sheet 1.

Witnesses.
Chas. F. Logan.
Geo. Willard Rich.

Inventor.
Frederick Robbin
J Church Church
his Attorneys

THE NORRIS PETERS CO., PHOTO-LITHO., WASHINGTON, D. C.

No. 609,048. Patented Aug. 16, 1898.
F. ROBBIN.
FURNACE.
(Application filed Feb. 15, 1898.)
(No Model.) 2 Sheets—Sheet 2.
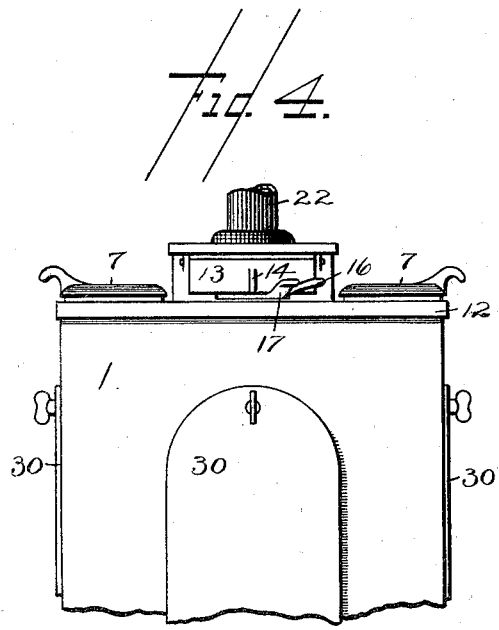
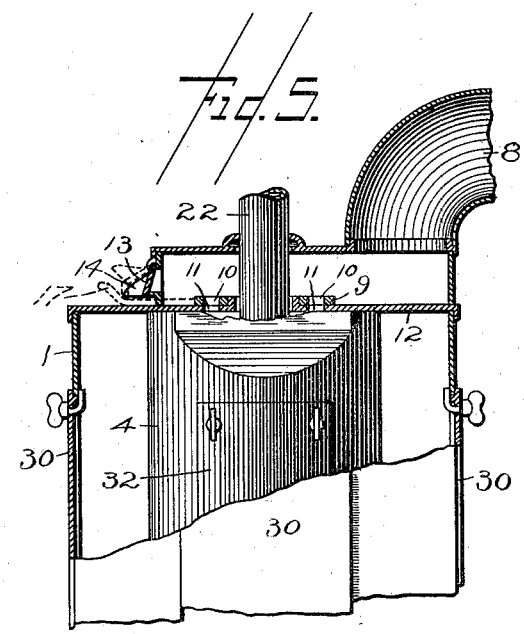
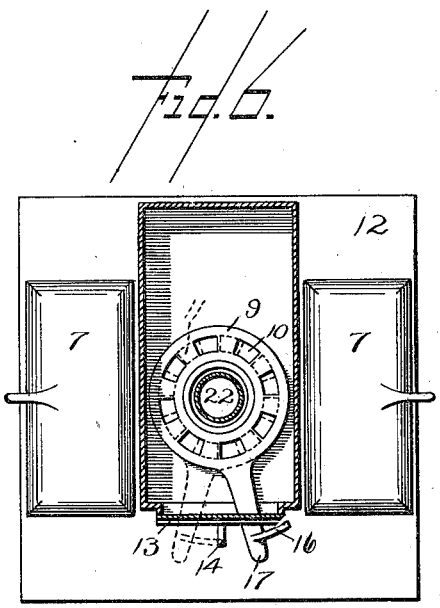
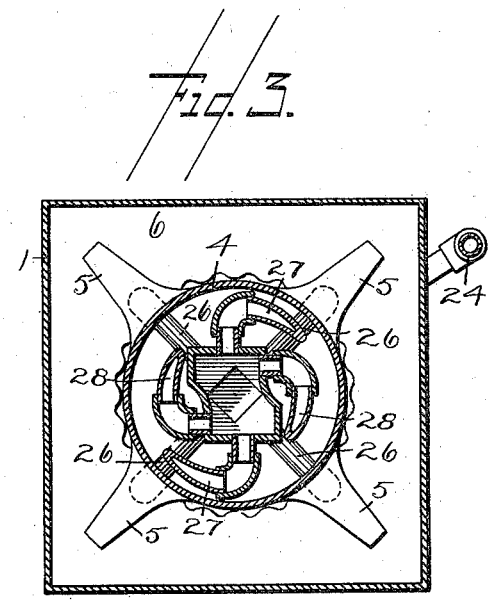
Witnesses.
Chas. F. Logan.
Geo. Willard Rich.
Inventor.
Frederick Robbin
by Church & Church
his Attorneys
THE NORRIS PETERS CO., PHOTO-LITHO., WASHINGTON, D. C.

UNITED STATES PATENT OFFICE.

FREDERICK ROBBIN, OF ROCHESTER, NEW YORK.

FURNACE.

SPECIFICATION forming part of Letters Patent No. 609,048, dated August 16, 1898.

Application filed February 15, 1898. Serial No. 670,404. (No model.)

*To all whom it may concern:*

Be it known that I, FREDERICK ROBBIN, of Rochester, in the county of Monroe and State of New York, have invented certain new and useful Improvements in Furnaces; and I do hereby declare the following to be a full, clear, and exact description of the same, reference being had to the accompanying drawings, forming a part of this specification, and to the reference-numerals marked thereon.

The object of my present invention is to provide a furnace particularly adapted for heating the water used in a system of hot-water heating for buildings; and it consists in certain improvements in construction whereby the water may be rapidly heated and caused to circulate through the mains and return to the boiler to be reheated after its temperature has been lowered.

It further consists in certain improvements in combinations of parts, all as will be hereinafter described, the novel features being pointed out in the claims at the end of this specification.

Figure 1:
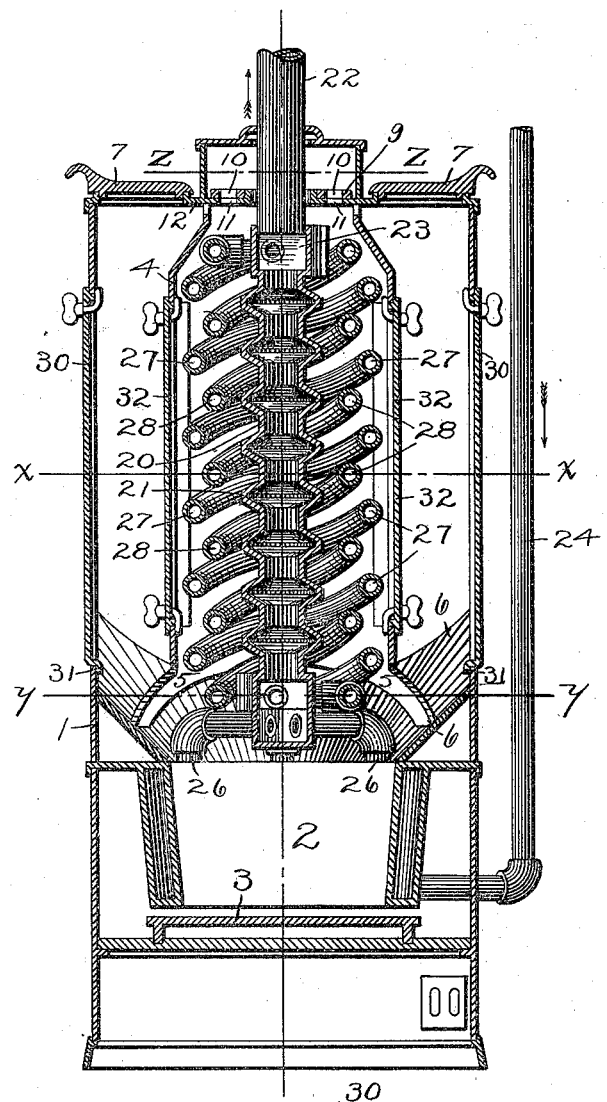
Figure 2:
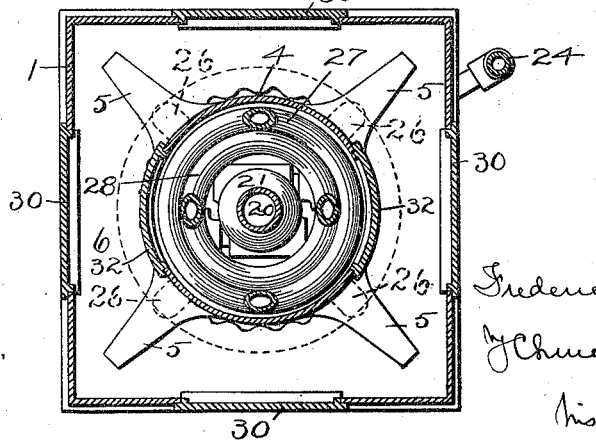

In the drawings, Figure 1 is a vertical sectional view of the boiler; Fig. 2, a cross-sectional view on the line $x\ x$ of Fig. 1; Fig. 3, a similar view on the line $y\ y$ of Fig. 1; Fig. 4, a front elevation of the top portion of the furnace; Fig. 5, a side elevation of the same, showing the outer casing in section; Fig. 6, a horizontal sectional view on the line $z\ z$ of Fig. 1.

Similar reference-numerals indicate similar parts.

In the construction of my boiler-furnace I employ an outer shell or casing 1, preferably rectangular and provided with the hollow fire-pot 2, and below this a grate 3 of the usual or any preferred construction. Arranged over the fire-pot is a cylindrical casing 4, having supporting-legs 5, resting upon an inclined plate 6, provided between the outer casing and the top of the fire-pot and forming the bottom of a fuel-reservoir located between the two casings, entrance to which is permitted through apertures covered by doors 7 upon the top of the furnace-casing. This inner casing forms a chamber for the combustion of the gases and other products of the fire before passing up the smoke-flue 8, and between these last-mentioned parts is provided a rotary damper 9, having openings or apertures 10, adapted when the damper is turned in one direction to register with similar apertures 11 in the plate 12, which forms the top of the combustion-chamber.

13 indicates a gravitating check-damper hinged upon its upper edge and adapted to be opened by means of a lug 14, coöperating with a beveled lug or projection 16 on the operating arm or handle 17, attached to the damper 9, which extends beneath the check-damper to the outside of the smoke-flue. When the damper 9 is closed, the beveled lug 16 engages with the projection 14, raising the door 13, admitting a supply of air to the chimney, and when the damper 9 is opened to give a direct draft to the fire the check-damper closes by its own weight, allowing the draft to be supplied through the fire.

Located within the inner casing I have provided a hollow vertical water-column 20, cylindrical in cross-section and provided with corrugations or enlargements 21 intermediate the ends for increasing the heating-surface, said ends being approximately rectangular.

22 indicates the supply-pipe, leading from the upper end 23 of the column 20 and which extends upward and through the smoke-flue and to the various radiators or heating devices. To rapidly heat the water, the return-pipe 24 is entered into the bottom of the fire-pot, said fire-pot being hollow and constructed in the form of a ring, which is connected to the water-column by pipes 26, located under and protected by the legs 5 of the inner casing. I also provide as a means for increasing the heating-surface and improving the circulation two spiral coils of pipe 27 28, of different size, connecting the opposite ends of the water-column, the coils of the former being the greater in diameter and extending upon the outside of the latter, as shown in Fig. 1.

Upon the front, rear, and sides of the outer casing are arranged removable doors 30, provided with engaging lugs or flanges 31 upon the rear side and turn-buttons upon one end, serving to keep the parts securely in place. Similar doors 32, placed in the sides of the inner casing opposite the doors in the sides of the furnace, permit access to the heating coils and pipes for purposes of cleaning or otherwise.

The purposes and operation of the furnace will now be understood.

The hot water rises through the central column and coils into the supply-pipe 22, thence to the radiators, from which upon being cooled it returns to the boiler by the return-pipe 24 and enters the hollow fire-pot ring 25, when it is reheated and passes by way of the pipes 26 to the water-column 20.

While the particular arrangement of parts is not necessary to the successful operation of my device, I prefer to employ the arrangement shown, in which the heating-coils are contained in the combustion-chamber and the latter is surrounded by the fuel-magazine, thereby preventing the radiation of the heat.

I claim as my invention—

1. In a furnace, the combination with the outer casing, an inner concentric casing separated from the former on all sides constituting a combustion-chamber or passage for the smoke and products and connecting at its upper end with the smoke-pipe, the entire space between the two casings forming a fuel-reservoir above the fire-pot, and the fire-pot arranged beneath the inner casing.

2. In a furnace, the combination with the outer casing, an inner concentric casing separated from the former on all sides constituting a combustion-chamber or passage for products and connected with the smoke-pipe, the space between the two casings constituting a fuel-reservoir above the fire-pot, the fire-pot arranged beneath the inner casing, and a water-heating column arranged within the inner casing.

3. In a furnace, the combination with the outer casing, an inner casing separated from the former on all sides constituting a combustion-chamber or passage for products and connected with the smoke-pipe, said inner casing having the legs at the bottom, and the entire space between the casings constituting a fuel-reservoir above the fire-pot, of the hollow fire-pot beneath the casing, a water-heating column arranged within the inner casing, and the water-pipes connecting the fire-pot with the column passing beneath and protected by the legs.

4. In a furnace, the combination with the combustion-chamber, the water-column arranged in said chamber and the supply and delivery pipes connected to said column at opposite ends, of an auxiliary water-pipe extending alongside the column and connected to it at opposite ends.

5. In a furnace, the combination with the combustion-chamber, the water-column arranged within it having the flattened portions near opposite ends, and the supply and delivery pipes connected to said column at opposite ends, of a coiled pipe extending around the column and connected to the flattened portions thereof.

6. In a furnace, the combination with the combustion-chamber, the water-column arranged within it, and the supply and delivery pipes connected to said column near opposite ends, of the two pipes concentrically and spirally coiled around the column and connected at opposite ends to it.

7. In a furnace, the combination with the plate arranged between the combustion-chamber and the smoke-pipe having the apertures for smoke and products, of the horizontal rotary perforated direct-draft damper, the pivoted check-damper controlling the admission of air to the smoke-pipe engaging and operated by the direct-draft damper.

8. The combination with the horizontal rotary perforated direct-draft damper having the inclined lug thereon, of the check-damper hinged at its upper end engaged by the lug on the first-mentioned damper and opened when the latter is closed and vice versa.

9. The combination with the furnace-casing having the chamber at the top connected with the smoke-pipe and the vertical apertures therein, and the pipe passing vertically through said chamber, of the gravitating check-damper controlling an opening between the chamber and the external air, the rotary direct damper on the casing having apertures corresponding to those in the casing and encircling the vertical pipe, and the inclined lug on said damper engaging the check-damper and operating to open the latter as the direct damper closes the openings in the casing and vice versa.

FREDERICK ROBBIN.

Witnesses:
F. F. CHURCH,
G. W. RICH.